United States Patent [19]

Sih

[11] 3,900,512

[45] Aug. 19, 1975

[54] 2-(6-CARBOMETHOXY-CIS-2-HEXENYL)-4(R)-HYDROXY-2-CYCLOPENTEN-1-ONE AND METHOD FOR PREPARING SAME

[75] Inventor: Charles J. Sih, Madison, Wis.

[73] Assignee: Wisconsin Alumni Research Foundation, Madison, Wis.

[22] Filed: Nov. 12, 1973

[21] Appl. No.: 411,772

[52] U.S. Cl. ..... 260/468 K; 260/326.43; 260/340.9; 260/456 P; 260/468 D; 260/483; 260/514 D; 260/514 K; 260/593 R; 260/594
[51] Int. Cl.$^2$ .................. C07C 61/38; C07C 69/74
[58] Field of Search ........ 260/468 K, 468 D, 514 K, 260/514 D

[56] References Cited
UNITED STATES PATENTS
3,803,219  4/1974  Vandeualle ...................... 260/51 K FOREIGN PATENTS OR APPLICATIONS
7,305,303  10/1973  Netherlands ...................... 260/468

OTHER PUBLICATIONS

Heather et al., Tet Letters, 2313, (1973).

Tinker et al., JACS, 74, 5235 (1952).

*Primary Examiner*—Robert Gerstl
*Attorney, Agent, or Firm*—Howard W. Bremer

[57] ABSTRACT

The compound 2-(6-carbomethoxy-cis-2-hexenyl-4(R)-hydroxy-2-cyclopenten-1-one and a process for preparing the said compound.

1 Claim, No Drawings

2-(6-CARBOMETHOXY-CIS-2-HEXENYL)-4(R)-HYDROXY-2-CYCLOPENTEN-1-ONE AND METHOD FOR PREPARING SAME

The Government has rights in this invention pursuant to Contract No. AID/csd 2965 awarded by the Agency for International Development.

This invention relates to a compound which is eminently useful as an intermediate in the preparation of prostaglandins and to methods for preparing such compound.

More particularly, this invention relates to a compound which is a key intermediate in the preparation of prostaglandins of the $E_2$, $F_2$, $A_2$ and $B_2$ series.

The prostaglandins, a family of $C_{20}$ carboxylic acids, are of great interest because of the broad spectrum of physiologic responses which they elicit in animals, including man, even in nanomolar concentrations. Prostaglandin $E_2$ ($PGE_2$) and prostaglandin $F_{2\alpha}$ ($PGF_{2\alpha}$) have commanded particular attention because they have elicited physiologic responses closely tied with reproduction. It has been observed, for example, that an intravenous injection of a very low dose of either $PGE_2$ or $PGF_{2\alpha}$ stimulates contraction of the uterus and that prostaglandins are present in amniotic fluid and in the venous blood of women during the contractions of labor. This suggests that the prostaglandins may play an important role in parturition. Other observations of the activity of prostaglandins, and particularly $PGF_{2\alpha}$ in the reproductive cycle in animals indicates that the prostaglandin and perhaps others may become important population controlling agents.

In general, the development of prostaglandins has been limited because of the shortage of these materials and consequently their high cost. The success of the $E_2$ and $F_{2\alpha}$ type of prostaglandins as family planning aids will depend not only on their specific activities but also on their availability — and it is anticipated that there will be a massive need for such compounds.

It is the primary purpose of this invention to provide a new compound which finds application as a key intermediate in the production of prostaglandins and to processes for producing such intermediate with a view toward making prostaglandins more readily available and at a lower price than is current.

The compound of this invention is 2-(6-carbomethoxy-cis-2-hexenyl)-4(R)-hydroxy-2-cyclopenten-1-one. A method for preparing this compound is shown in the following schematic diagram and is set forth in detail in the following text.

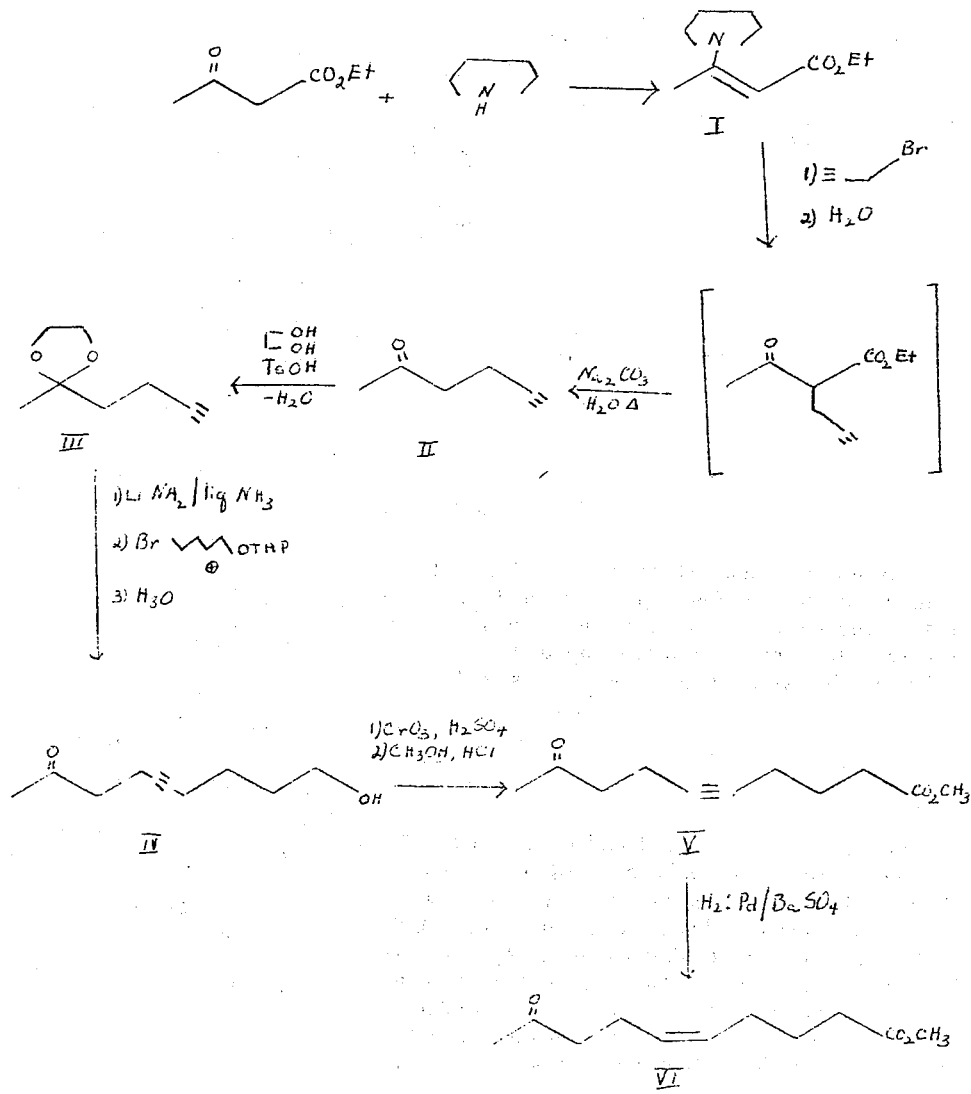

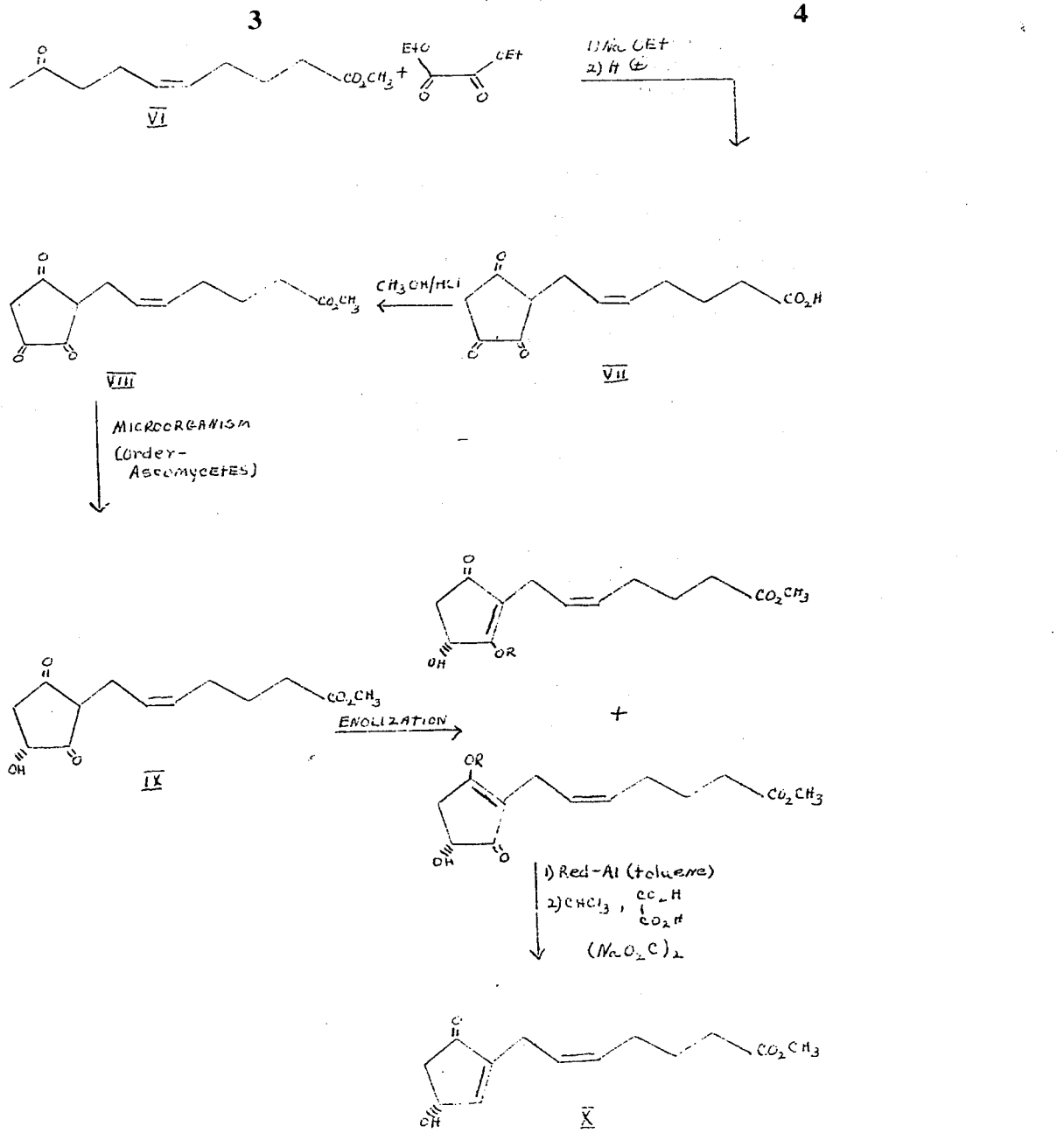

Following is a detailed description of the above-diagrammed process. The roman numeral designations in the foregoing schematic and in the following description serve to identify the same compounds.

3-N-pyrolidinyl-2-butenoic acid ethyl ester (I)

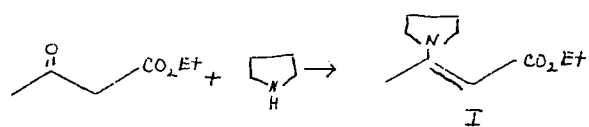

Ethyl acetoacetate (260 g, 2 mol) was mixed with 190 ml of pyrolidine (162 g, 2.3 mol). After cooling (ca 30 min.) the reaction mixture was heated and the water was distilled through a Dean-Stark condenser. After collection of the theoretical amount of $H_2O$ (38 ml), 750 ml of benzene was distilled off and the remainder of benzene removed on a Roto-evaporator. Distillation in vacuum (b.p. 114°–116°/0.6 mm) afforded 360 g (98%) of a yellow oil. NMR analysis showed the following signals.

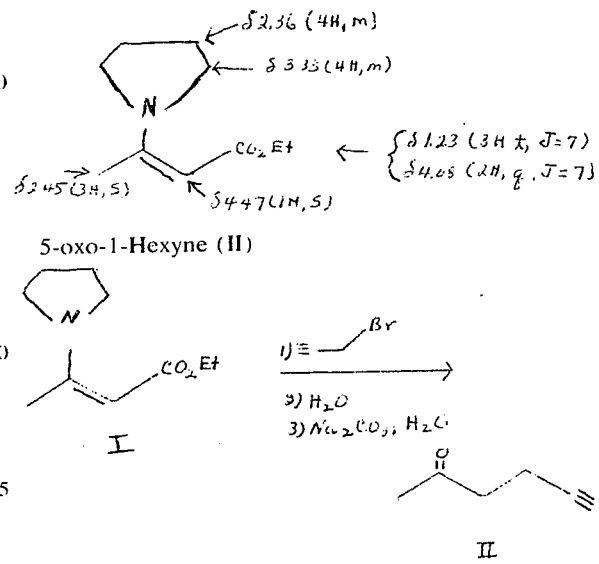

To 226 g (1.9 mol) of propargyl bromide was added 342 g (1.87 mole) of the enamine, I. Over the next 45 min., the temperature rose to 35° C. The reaction mixture was placed in a bath to maintain the temperature at ca 30° or lower. After standing overnight, the mixture became a thick oil with a very small amount of mobil oil on top. Water (400 ml) was added and heated on a steam bath for 5–10 min. After cooling, the aqueous layer was extracted with ether twice. The combined ethereal layer was washed with water, 1NHCl, H₂O, and saturated NaCl. After evaporating off the ether, the residue was added dropwise over a period of 3 hrs. to a distilling mixture of 600 g Na₂CO₃ and 4.25 l of H₂O. After the addition is completed, distillation was continued until condensate was no longer cloudy. The layers were separated and the aqueous layer was extracted with ether. The combined organic layers were washed successively with H₂O, NaHCO₃, H₂O, and saturated NaCl. After evaporation of the diethyl ether, the oily residue was distilled at 49°–52°/14–15 min. to yield 128 g (68%) of II.

5-ethylenedioxy-1-Hexyne (III)

A mixture of 138 g (1.43 mol) of II, 150 ml of ethylene glycol, and a small amount of p-toluene-sulfonic acid in 600 ml of benzene was refluxed. The resulting water was removed through a Dean-Stark condenser. After 6 hrs., the reaction mixture was cooled and solid K₂CO₃ was added and allowed to stand. After the addition of water, the reaction mixture was extracted with diethyl ether. The combined ethereal layer was washed successively with water, and saturated NaCl. Evaporation of the ether, followed by distillation of the residue gave 177 g (89%) of III, b.p. 73°–76°/16 mm.

9-oxo-5-dexyne-1-ol (IV)

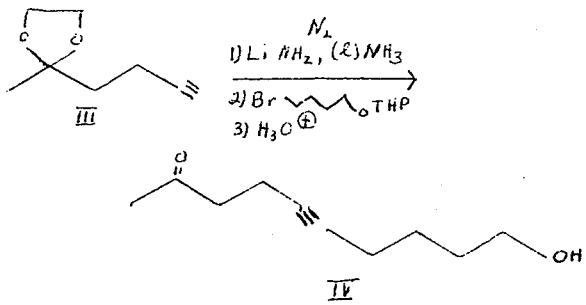

Approximately 75 ml of NH₃(l) was condensed into a flask containing 1.40 g (120%) LiNH₂ (Ventron). Over a 5 min. period 7 g of the ketal, III was added dropwise along with 10 ml of Tetrahydrofuran (THF). The mixture was stirred for 45 min. and 13 g (110%) of bromide was added along with 20 ml of THF. The reaction mixture was stirred under a solid CO₂-acetone condenser for 2 hrs., the NH₃ was removed at room temperature. Methanol (100 ml) was added and the pH of the reaction mixture was adjusted to 2.0. Water (25 ml) was added to make a homogenous solution and the content was stirred at room temperature for 30 min. and then refluxed for 15 min. After addition of water, the aqueous layer was extracted three times with ethyl acetate. The combined organic layers were washed with water, saturated NaCl and dried over Na₂SO₄. After evaporation of ethyl acetate 7.48 g (89%) of IV was obtained as an oil.

9-oxo-5-Decynoic acid methyl ester

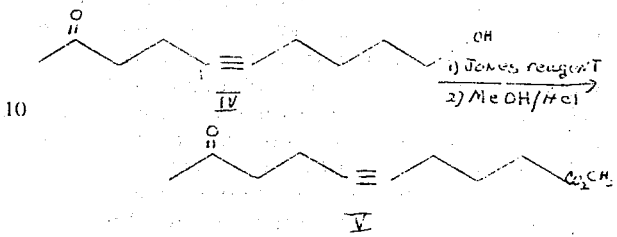

To 54 g of IV, dissolved in 800 ml of acetone at 0°C., was added dropwise 150 ml of Jones reagent over a period of 2 hrs. After the addition is completed, the reaction mixture was stirred for 30 min., and the excess Jones reagent was destroyed by the addition of isopiopyl alcohol. After removal of acetone, the contents were extracted with diethyl ether. The organic layer was extracted with saturated sodium bicarbonate solution (three times). The bicarbonate solution was then acidified and extracted with diethyl ether. After washing the ethereal layer with water and saturated NaCl solution, it was dried over Na₂SO₄ and evaporated to yield an oily residue. A similar run using 59 g of acid was repeated and the resulting acid was combined (68 g). Recovered unreacted substrate from two runs was 28 g.

The crude keto acid (68 g) was dissolved in 500 ml of 3% MeOH/HCl and allowed to stand overnight at room temperature. After removing the solvent, the residual oil was distilled at 94°–96°/0.03 mm to yield 60 g of V.

9-oxo-5-cis-decenoic acid methyl ester (VI)

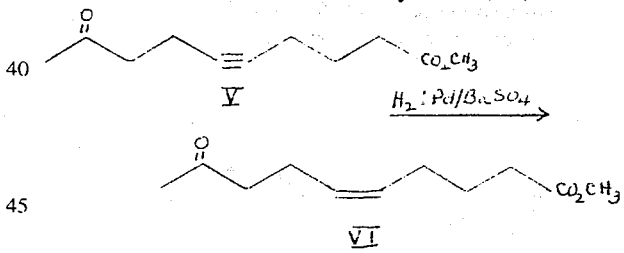

A hydrogenation flask was charged with 200 ml of benzene, 800 mg of 5% Pd over BaSO₄ (Lindlar catalyst) and 4.4 ml of freshly distilled quinoline. The flask was evacuated and filled with hydrogen. To this was added 26 g of V in 50 ml of benzene. The absorption of hydrogen started immediately. The uptake of one equivalent of hydrogen (3146 ml) was complete after 90 minutes. The reaction was terminated, the catalyst filtered off, and the solvent removed to yield 25 g of VI.

2-(6-carboxy-cis-5-hexenyl)-cyclopentane-1,3,4-trione (VII)

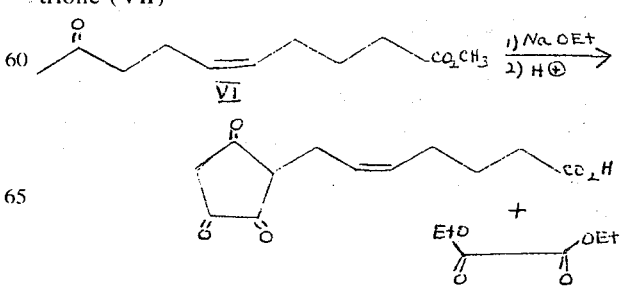

In a 15 ml three-necked flask was placed 5 ml of anhydrous ethanol and 0.276 g (0.012 mole) of sodium metal under an atmosphere of nitrogen. When all the sodium had dissolved, the contents were cooled to 0°C., a mixture of diethyl oxalate (1.5 ml, 0.011 mole) and VI (1 g; 0.005 mole) was added dropwise over a period of 1 hour. After the addition was completed, the mixture was stirred at room temperature for 2 hours and refluxed for another hour. After cooling, 0.8 ml of glacial acetic acid was added, and the ethanol was removed using a rotary evaporator. The residue was dissolved in 40 ml of 2N HCl and refluxed for 4 hours under nitrogen. After cooling, the supernatant was decanted off from the black oil and extracted three times with ethyl acetate. The combined organic layers were washed with saturated sodium chloride, dried over MgSO₄ and evaporated to dryness to yield VII (1.3 g)

2-(6-carbomethoxy-cis-5-hexenyl)-cyclopentane-1,3,4-trione (VIII)

pension were used to inoculate 50 ml of the soybean-dextrose medium above held in 250 ml. Erlenmeyer flasks (F-1 state). The flasks were incubated at 25°C. on a rotary shaker (250 cycles/min - 2 inches radius) for 24 hours, after which a 10% by volume transfer was made to each of four 2 liter Erlenmeyer flasks (F-2 stage), containing 500 ml. of the soybean dextrose medium. After 24 hours of incubation on a rotary shaker, 250 mg of 2-(6-carbomethoxy-cis-5-hexenyl)-cyclopentane-1,3,4-trione (VIII) dissolved in 2 ml of dimethylformamide was added to each flask. The F-2 stage flasks were then incubated for an additional 24 hours under the condition used in the incubation of the F-1 stage flaks.

B. Isolation

Twenty-four hours after the addition of VIII, the cells were removed by centrifugation. The supernatant was adjusted to pH 2.5 with 6N HCl, and was exhaustively extracted with 1.5 liters of ethyl acetate three times.

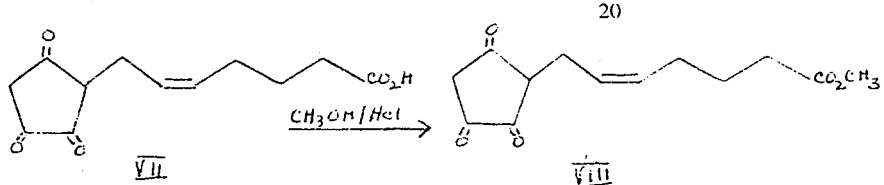

The crude trione (1.3 g) was dissolved in 3% methanolic hydrogen chloride (15 ml) and the mixture was allowed to stand at room temperature overnight. Methanol was evaporated. The residue treated with 10% NaHCO₃ solution and extracted (X3) with ethyl acetate. The basic solution was made strongly acidic and extracted with ethyl acetate. The organic phase washed with water, saturated sodium chloride, dried and evaporated to afford pure trione ester (700 mg, 56% based on the decanoic ester used).

2-(6-carbomethoxy-cis-5-hexenyl)-4(R)-hydroxy-cyclopentane-1,3-dione (IX)

The ethyl acetate was dried over Na₂SO₄ and evaporated to afford an oil residue. This residue was dissolved in 0.5 ml of benzene-ethyl acetate (1:1) and added onto a column (32 × 2.5 cm.) of silicic acid-Celite (85:15). The column was eluted with a gradient system consisting of 500 ml of 50% ethyl acetate-benzene in the mixing chamber and 500 ml of pure ethyl acetate in the reservoir, and 7 ml fractions were collected. Fractions 31-96 containing the desired product were pooled and concentrated to dryness yielding 860 mg of oily residue. Recrystallization from ethyl acetate-petroleum ether gave IX, m.p. 61.5°–62.5°; uv

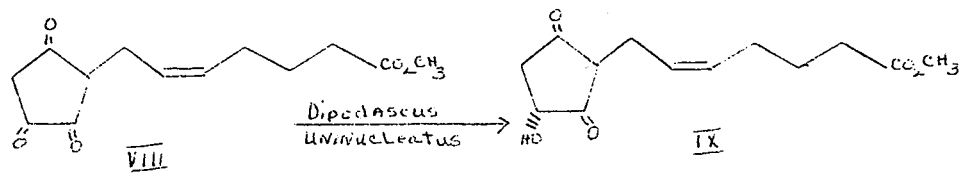

A. Fermentation

The surface growth from a one week old agar slant of *Dipodascus uninucleatus* was suspended in 5 ml. of saline (0.85%) solution. Two ml portions of this susmax (CH₃OH)272 nm (ε21,000); [α]$_D^{24}$ + 24.7° (C, 1.47, CHCl₃).

2-6-carbomethoxy-cis-2-hexenyl)-4(R)-hydroxy-2-Cyclopenten-1-one (X)

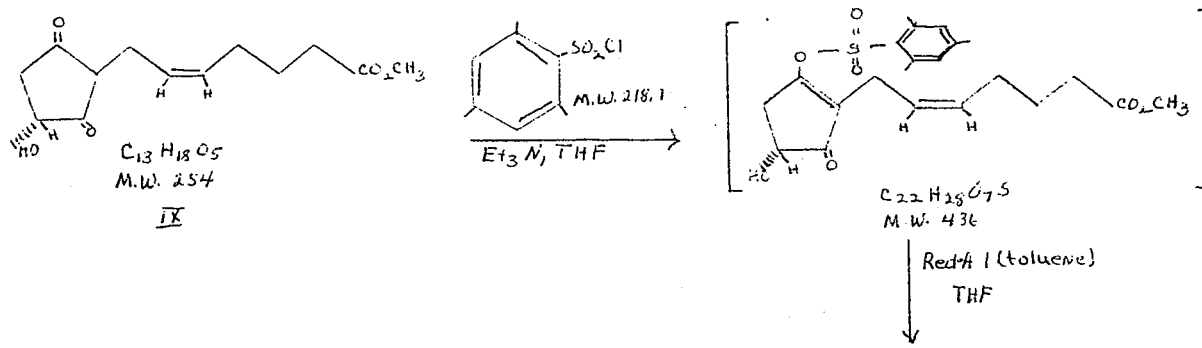

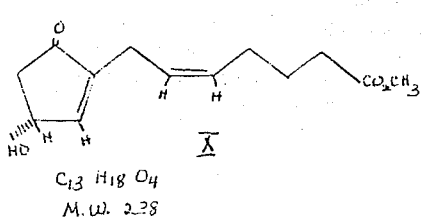

$C_{13}H_{18}O_4$
M.W. 238

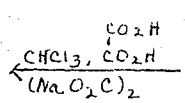

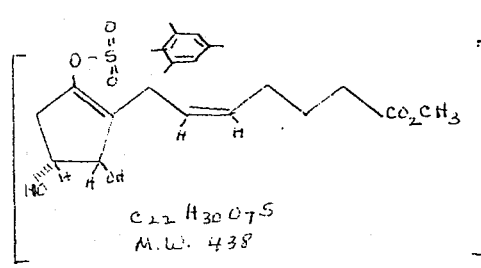

$C_{22}H_{30}O_7S$
M.W. 438

To a mixture of 2.99 g (11.8 mmol) of hydroxydione methyl ester (IX) and 3.4 ml (24.2 mmol) of triethylamine (dry) and 40 ml dry tetrahydrofuran stirred under $N_2$ at $-10°$ C, was added dropwise a solution of 3.27 g (14.8 mmol) (99%) of 2-mesitylene sulfonyl chloride in 25 ml of dry THF over 15 minuts. A solid precipitated out after a few mols of solution had been added. The resulting mixture was stirred at $-10°$ to $0°$ C. for 35 minutes and then at room temperature for 1 hour.

The solution was filtered through glass wool into a separatory funnel, rinsing with 30 ml dry THF. This solution was added dropwise over 35 minutes to a solution of 35 ml of 1.5 M Red-Al in toluene in 50 ml dry THR, kept at $-70°$ or lower by dry ice acetone bath and by rate of addition. The solution was added slowly at first and then more rapidly at the end. The resulting solution was stirred at $-70°$ to $-76°$ C. for a further 45 minutes. Then added a solution of 30 ml of glacial acetic acid in 30 ml of dry THR over ca 20 minutes keeping the temperature at ca $-70°$ C. Added very slowly at beginning due to frothing, but later much more rapidly. Allowed to warm to room temperature. It was poured into water (400 ml) and extracted with ether (4 × 250 ml). The combined ethereal extract was washed with water (2 × 250 ml), a saturated sodium bicarbonate solution (1 × 250 ml) and a saturated sodium chloride solution (1 × 100 ml), dried ($MgSO_4$) and evaporated to dryness to give an orange oil.

The oil was dissolved in 150 ml of chloroform. Sodium oxalate plus a small amount of oxalic acid were added. The flask was stoppered and placed in the freezer overnight.

The following morning it was stirred at room temperature for 2 hours. A tlc plate (run in $CHCl_3$ acetone > = 0(8:2) showed that the rearrangement was complete after 1 hours. The solution was filtered and the solid washed well with chloroform. The chloroform solution was evaporated to dryness to give a dark oil. Chromatographed Wt: 3.3 g. Wt: 1.27 g from chromatography, 1.27 g of X, uv max ($CH_3OH$) 220 nm ($\epsilon 8,000$); $[\alpha]_D^{24}$ + 10.85° (C 2.62, $CH_3OH$).

It is to be understood that various changes can be made in various of the steps of the aforedescribed process. For example, the enolization can be readily carried out with reagents other than 2-mesitylenesulfonyl chloride; preparation of the enol ester as enol ether being readily accomplished as described in co-pending application Ser. No. 309,766, filed Nov. 27, 1972 in the names of Charles J. Sih and James B. Heather. Also, various other hydride reducing agents than Red-Al (sodium-dihydrobis (2-methoxyethoxy) aluminate) such as lithium borohydride, diisobutyl aluminum hydride and lithium aluminum hydride can be used. In addition, microorganisms other than the specifically shown dipodascus uninucleaturs can be employed (see co-pending application Ser. No. 293,457, filed Sept. 29, 1972 in the name of Charles J. Sih). Alternative reactants for various of the processing steps will also be apparent to those skilled in the art.

The 2-(6-carbomethoxy-cis-2-hexenyl)-4(R)-hydroxy-2-cyclopenten-1-one is readily converted to $PGE_2$ in accordance with the method described in Tetrahedron Letters No. 25, pp. 2313–2316 (1973) (Pergamon Press) the disclosures of which are incorporated herein by reference.

Once $PGE_2$ has been obtained conversion to the $PGA_2$ and $PGB_2$ can be obtained by well known means, i.e. by treating $PGE_2$ with an acid or base to convert it to the $PGA_2$ series and then treating the $PGA_2$ with a base to convert it into the $PGB_2$ series. Also, the 9-keto function can readily be reduced to give the $PGF_{2\alpha}$ and $PGF_{2\beta}$ series.

Thus, the present invention provides a totally asymmetric process for the production of $PGE_2$.

Having thus described the invention what is claimed is:

1. A method for preparing 2-(6-carbomethoxy-cis-2-hexenyl)-4(R)-hydroxy-2-cyclopenten-1-one which comprises:

reacting the pyrrolidine enamine of aceto-acetic ester with propargyl bromide subjecting the resulting produce to alkaline hydrolysis and decarboxylation and recovering 5-oxo-1-hexyne reacting the 5-oxo-1-hexyne with ethylene glycol in the presence of p-toluene sulfonic acid to obtain the corresponding cycloethylene ketal, 5-ethylenedioxy-1-hexyne subjecting the said ketal to treatment with lithium amide in liquid ammonia and to condensation with 1-bromo-4-tetrahydropyranyloxybutane in tetrahydrofuran to obtain the equivalent ethylene ketal-THP ether subjecting the said ether to acid hydrolysis and recovering 9-oxo-5-decyn-1-ol oxidizing the 9-oxo-5-decyn-1-ol with Jones reagent, esterifying the resulting product under acid conditions to obtain 9-oxo-5-decynoic acid methyl ester hydrogenating the said ester over Lindlar's catalyst and recovering 9-oxo-5-cis-decenoic acid methyl ester condensing the said decenoic acid methyl ester with diethyl oxalate, hydrolyzing the reaction product under acid conditions and recovering 2-(6-carboxy-cis-5-hexenyl)- cyclopentane 1,3,4-trione from the resulting reaction mixture reesterifying the said trione, incubating the resulting ester with a microorganism of the order Ascomycetes and recovering 2-(6-carbomethoxy-cis-5-hexenyl)-4(R)-hydroxy-cyclopentane-1,3,-dione enolizing the said dione to preferentially promote acylation or alkylation of the oxygen at the C-1 position and recovering the substituted C-1 enol reducing the said substituted C-1 enol with a hydride reducing agent acidifying the reaction mixture and recovering 2-(6-carbomethoxy-cis-2-hexenyl-4(R)-hydroxy-2-cyclopenten-1-one from the reduction reaction mixture.

\* \* \* \* \*